United States Patent
Vankayala et al.

(10) Patent No.: US 11,010,292 B2
(45) Date of Patent: May 18, 2021

(54) METHOD AND SYSTEM FOR DYNAMIC MEMORY MANAGEMENT IN A USER EQUIPMENT (UE)

(71) Applicant: Samsung Electronics Co., Ltd., Gyeonggi-do (KR)

(72) Inventors: Satya Kumar Vankayala, Karnataka (IN); Dheeraj Kumar, Karnataka (IN); Satya Venkata Uma Kishore Godavarti, Karnataka (IN); Ashok Kumar Reddy Chavva, Karnataka (IN); Vishal Devinder Karira, Karnataka (IN); Nithin Srinivasan, Karnataka (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/665,607

(22) Filed: Oct. 28, 2019

(65) Prior Publication Data
US 2020/0133853 A1 Apr. 30, 2020

(30) Foreign Application Priority Data

Oct. 26, 2018 (IN) .......... 201841040460 PS
Oct. 21, 2019 (IN) .......... 201841040460 CS

(51) Int. Cl.
*G06F 12/06* (2006.01)
*H04L 1/18* (2006.01)
*H04W 88/02* (2009.01)

(52) U.S. Cl.
CPC ........ *G06F 12/0646* (2013.01); *H04L 1/1812* (2013.01); *G06F 2212/1044* (2013.01); *G06F 2212/161* (2013.01); *H04W 88/02* (2013.01)

(58) Field of Classification Search
CPC ............. G06F 12/00–128; H04L 1/1812–1896
See application file for complete search history.

(56) References Cited

U.S. PATENT DOCUMENTS 8,160,049 B2  4/2012 Chandra et al.
8,885,525 B2 * 11/2014 Hsieh ............... H04L 1/1845
                                                  370/280

(Continued)

FOREIGN PATENT DOCUMENTS

WO  WO 2008/097001    8/2008
WO  WO 2017/221871   12/2017
WO  WO 2018/174473    9/2018

OTHER PUBLICATIONS

3GPP, 3rd Generation Partnership Project; Technical Specification Group Radio Access Network; Evolved Universal Terrestrial Radio Access (E-UTRA); Physical Layer Procedures (Release 15), 3GPP TS 36.213 V15.3.0, Sep. 2018, 227 pages.

(Continued)

*Primary Examiner* — Gennadiy Tsvey
(74) *Attorney, Agent, or Firm* — The Farrell Law Firm, P.C.

(57) ABSTRACT

A method of dynamic memory management in a user equipment (UE) is provided. The method includes receiving, by the UE, transport block size (TBS) information, from a base station (BS), associated with a data packet to be transmitted by the BS to the UE; identifying, by the UE, a plurality of empty bins and a size of each of the plurality of empty bins in a memory of the UE; detecting, by the UE, a presence of one or more empty bins, among the plurality of empty bins in the memory, with a size of each of the one or more empty bins greater than the TBS of the data packet; and allocating, by the UE, a smallest size empty bin, with a size greater than the TBS of the data packet, among the one or more empty bins to the data packet.

18 Claims, 8 Drawing Sheets

(56) References Cited

U.S. PATENT DOCUMENTS

| | | |
|---|---|---|
| 9,480,048 B2 | 10/2016 | Earnshaw et al. |
| 9,565,140 B2 | 2/2017 | Yu et al. |
| 9,819,454 B2 | 11/2017 | Jain et al. |
| 2002/0004842 A1* | 1/2002 | Ghose .................. H04L 69/163 709/235 |
| 2002/0150049 A1* | 10/2002 | Collier .................. H04L 47/29 370/236 |
| 2005/0080874 A1* | 4/2005 | Fujiwara ............... G06F 3/0617 709/217 |
| 2006/0069898 A1* | 3/2006 | Patel .................... G06F 12/023 711/171 |
| 2008/0162856 A1* | 7/2008 | Chai ...................... G06F 30/34 711/170 |
| 2008/0235409 A1* | 9/2008 | Ryzhykh ................ H04L 47/30 710/22 |
| 2009/0059801 A1* | 3/2009 | Garrett .................. H04L 1/1812 370/242 |
| 2010/0272033 A1* | 10/2010 | Fwu ...................... H04L 1/1835 370/329 |
| 2010/0296427 A1* | 11/2010 | Lohr ...................... H04L 1/1822 370/312 |
| 2011/0164694 A1* | 7/2011 | Yamasaki ............. H04L 67/2842 375/259 |
| 2011/0292975 A1* | 12/2011 | Kuwahara ........... H04N 1/32795 375/219 |
| 2012/0120889 A1* | 5/2012 | Cheng .................... H04L 1/1896 370/329 |
| 2014/0250343 A1 | 9/2014 | Mueller-Weinfurtner et al. |
| 2017/0099664 A1 | 4/2017 | Lunttila et al. |
| 2017/0264404 A1* | 9/2017 | Huang .................. H04W 72/048 |
| 2018/0124764 A1 | 5/2018 | Lee |
| 2018/0139743 A1* | 5/2018 | Yang ........................ H04W 4/70 |
| 2018/0227938 A1 | 8/2018 | Lee et al. |
| 2019/0181986 A1 | 6/2019 | Kitamura et al. |
| 2019/0236001 A1* | 8/2019 | Patel ..................... G06F 3/0631 |
| 2019/0394000 A1 | 12/2019 | Kim et al. |
| 2020/0052824 A1* | 2/2020 | Bienas .................. H04W 28/04 |

OTHER PUBLICATIONS

International Search Report dated Feb. 3, 2020 issued in counterpart application No. PCT/KR2019/014305, 7 pages.

* cited by examiner

METHOD AND SYSTEM FOR DYNAMIC MEMORY MANAGEMENT IN A USER EQUIPMENT (UE)

CROSS-REFERENCE TO RELATED APPLICATION(S)

This application is based on and claims priority under 35 U.S.C. § 119 to Indian Provisional Patent Application No. 201841040460 (PS) filed on Oct. 26, 2018 and Indian Complete Patent Application No. 201841040460 (CS), filed on Oct. 21, 2019, in the Indian Patent Office, the disclosure of each of which is herein incorporated by reference.

BACKGROUND

1. Field

The present disclosure generally relates to field of telecommunication network. Particularly, but not exclusively, the present disclosure relates to method and system for dynamic memory management in a user equipment (UE).

2. Description of the Related Art

To meet the demand for wireless data traffic, which has increased since deployment of 4G communication systems, efforts have been made to develop an improved 5G or pre-5G communication system. The 5G or pre-5G communication system is also called a "beyond 4G network" or a "post LTE (long term evolution) system". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (mMIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of IoT technology and big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth are being researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and IoT technology.

SUMMARY

In accordance with an aspect of the disclosure, a method for dynamic memory management in a UE is provided. The method includes receiving, by a UE, transport block size (TBS) information, from a base station (BS), associated with a data packet to be transmitted by the BS to the UE, identifying, by the UE, a plurality of empty bins and a size of each of the plurality of empty bins in a memory of the UE, detecting, by the UE, a presence of one or more empty bins, among the plurality of empty bins in the memory, with a size of each of the one or more empty bins greater than the TBS of the data packet, and allocating, by the UE, a smallest size empty bin, with a size greater than the TBS of the data packet, among the one or more empty bins to the data packet.

In accordance with another aspect of the disclosure, a UE for dynamic memory management is provided. The UE includes a processor and a memory communicatively coupled to the processor, wherein the memory is configured to store processor-executable instructions, which, upon execution, cause the processor to receive TBS information, from a BS, associated with a data packet to be transmitted by the BS to the UE, identify a plurality of empty bins and a size of each of the plurality of empty bins in the memory of the UE, detect a presence of one or more empty bins, among the plurality of empty bins in the memory, with a size of each of the one or more empty bins greater than the TBS of the data packet, and allocate a smallest size empty bin among the one or more empty bins to the data packet.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
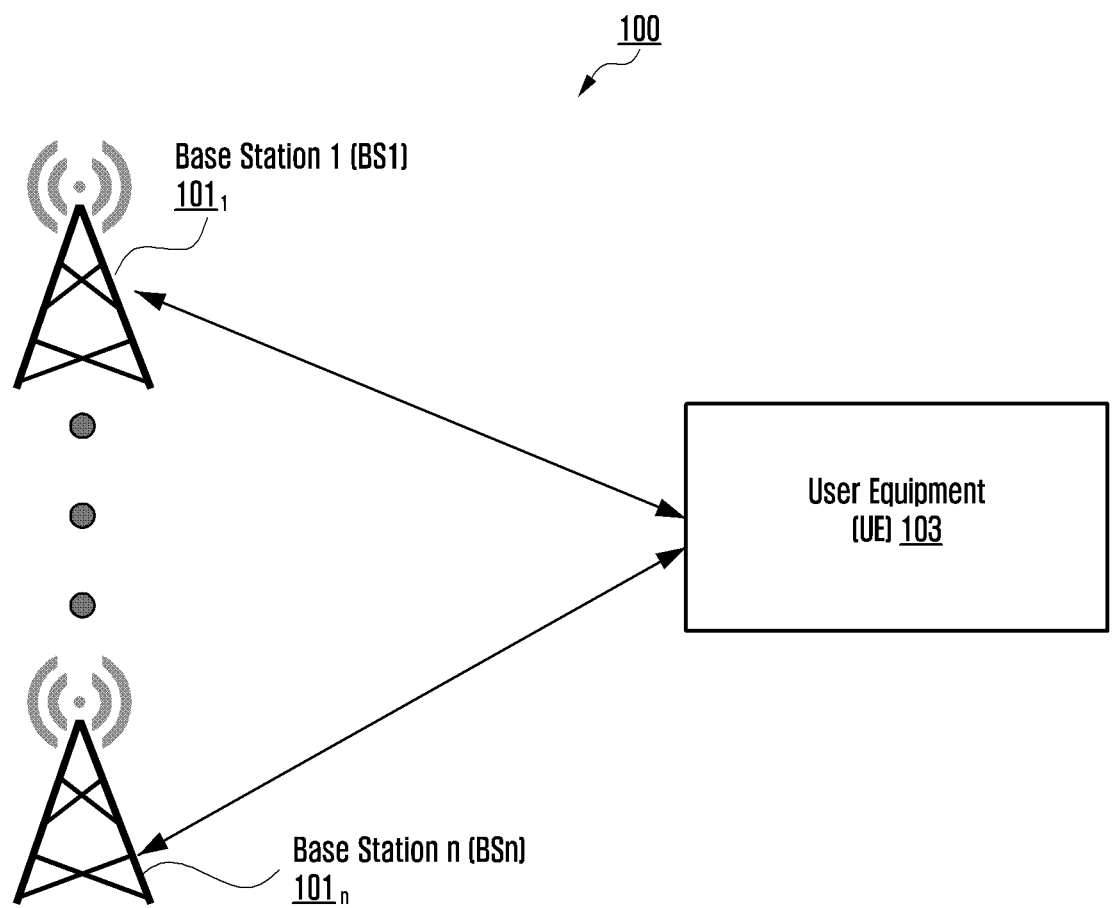
FIG. 1A illustrates an architecture of a system for dynamic memory management in a user equipment (UE) in accordance with an embodiment.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however that it is not intended to limit the disclosure to the specific forms disclosed, but on the contrary, the disclosure is to cover all modifications, equivalents, and alternatives falling within the scope of the disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable media and executed by a computer or processor, whether such computer or processor is explicitly shown.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In a wireless network, a HARQ protocol is used between BSs and a UE to ensure high reliability and high data transmission efficiency while transmitting data packets. A UE should have enough memory (also referred as soft buffer space) to store data packets which are not decoded successfully and a size of each buffer space should be greater than or equal to a sum of a maximum TBS of the data packets and redundancy versions. The redundancy versions may be used to decode the data packets.

The current HARQ protocol implementation allows throughput of the HARQ protocol to be static for a given configuration. For, LTE systems, a memory space is equally divided for 8 HARQ processes and, hence, a UE may accommodate only 8 HARQ processes. A static memory allocation of data packets is calculated based on largest TBS of a data packet and corresponding redundancy versions. The problem associated with the static memory allocation is that the UE may not receive a largest TBS data packet due to number of downlink frequency carriers carrying the data packet and, hence, some memory may be wasted or may not be optimally utilized.

Therefore, a conventional method increases memory of a UE in order to increase a number of HARQ processes. However, the increase of the memory in the UE may lead to an increase in a cost of a user device.

The present disclosure discloses a method for dynamic memory management in a UE which supports a greater number of HARQ processes.

The present disclosure discloses a method which reduces latency of data packets by effectively utilizing memory of a UE.

The present disclosure increases throughput of a UE in single connectivity or multi connectivity scenario across BSs without increasing a size of memory in the UE.

The present disclosure supports high round trip time for providing HARQ feedback for successful receipt and decoding of a data packet.

The present disclosure provides a method and a system for dynamic memory management in a UE. The system comprises one or more BSs and a UE. The one or more BSs may be configured to transmit data packets to the UE in a cellular network. The data packets may be associated with a HARQ process. For example, a UE may include, but is not limited to, a mobile phone, a laptop computer and any computing device capable of receiving and transmitting data. A UE may receive TBS information associated with a data packet to be transmitted by a BS, from the BS. A TBS indicates block size of a data packet. Thereafter, the UE may identify a plurality of empty bins and a size of each of the plurality of empty bins in a memory of the UE to accommodate a data packet which is to be received from the BS. Thereafter, the UE may detect a presence of one or more empty bins among the plurality of empty bins in the memory wherein a size of each of the one or more empty bins is greater than the TBS of the data packet. For example, a TBS associated with a data packet may be 50 kb. There may be 5 empty bins in a memory of a UE, namely empty bin 1, empty bin 2, empty bin 3, empty bin 4 and empty 5 and a size of each of the 5 empty bins may be 10 kb, 50 kb, 60 kb, 70 kb, and 50 kb, respectively. The UE may identify that the sizes of empty bin 3 and empty bin 4 are greater than the TBS of the data packet. Therefore, the UE may select one empty bin among empty bin 3 and empty bin 4 with a smallest size and allocate the data packet. In this scenario, the size of empty bin 3 may be the smallest as compared with the size of empty bin 4. Hence, the UE may allocate the data packet to empty bin 3. In another embodiment, the UE may detect an absence of one or more empty bins among a plurality of empty bins with a size greater than the TBS of the data packet. In such a scenario, the UE may reconfigure the plurality of empty bins to create an empty bin with a size greater than the TBS of the data packet and thereafter allocate the data packet to the created empty bin.

FIG. 1A illustrates an architecture of a system 100 for dynamic memory management in a UE 103 in accordance with an embodiment.

Referring to FIG. 1A, the system 100 includes one or more BSs (e.g., BS1 101$_1$ to BSn 101$n$ (alternatively referred as one or more BSs 101) and the UE 103. For example, the UE 103 may include, but is not limited to, a mobile phone, a laptop computer and any computing device capable of receiving and transmitting data. The BS 101 may be a transceiver which connects the UE 103 to a central hub and allows connection to a cellular network. In an embodiment, the one or more BSs 101 may be configured to transmit data packets to the UE 103. The present disclosure may employ Frequency Division Duplex (FDD) wherein the BS 101 and the UE 103 operate at different carrier frequencies for transmitting and receiving data packets. However, the present disclosure may also be extended to a Time Division Duplexing (TDD) technique wherein the BS 101 and the UE 103 may operate at a single frequency for transmitting and receiving data packets. In an embodiment, the UE 103 may include a HARQ memory for storing data packets transmitted by the UE 103. In LTE, the HARQ memory may be equally divided and, hence, 8 data packets may be stored and the UE 103 may take 8 milliseconds to confirm or provide an acknowledgement to the BS 101 on whether the data packets are successfully received and decoded at the UE 103. However, in the present disclosure, the HARQ memory may be dynamically configured to incorporate more than 8 data packets.

Figure 1B:
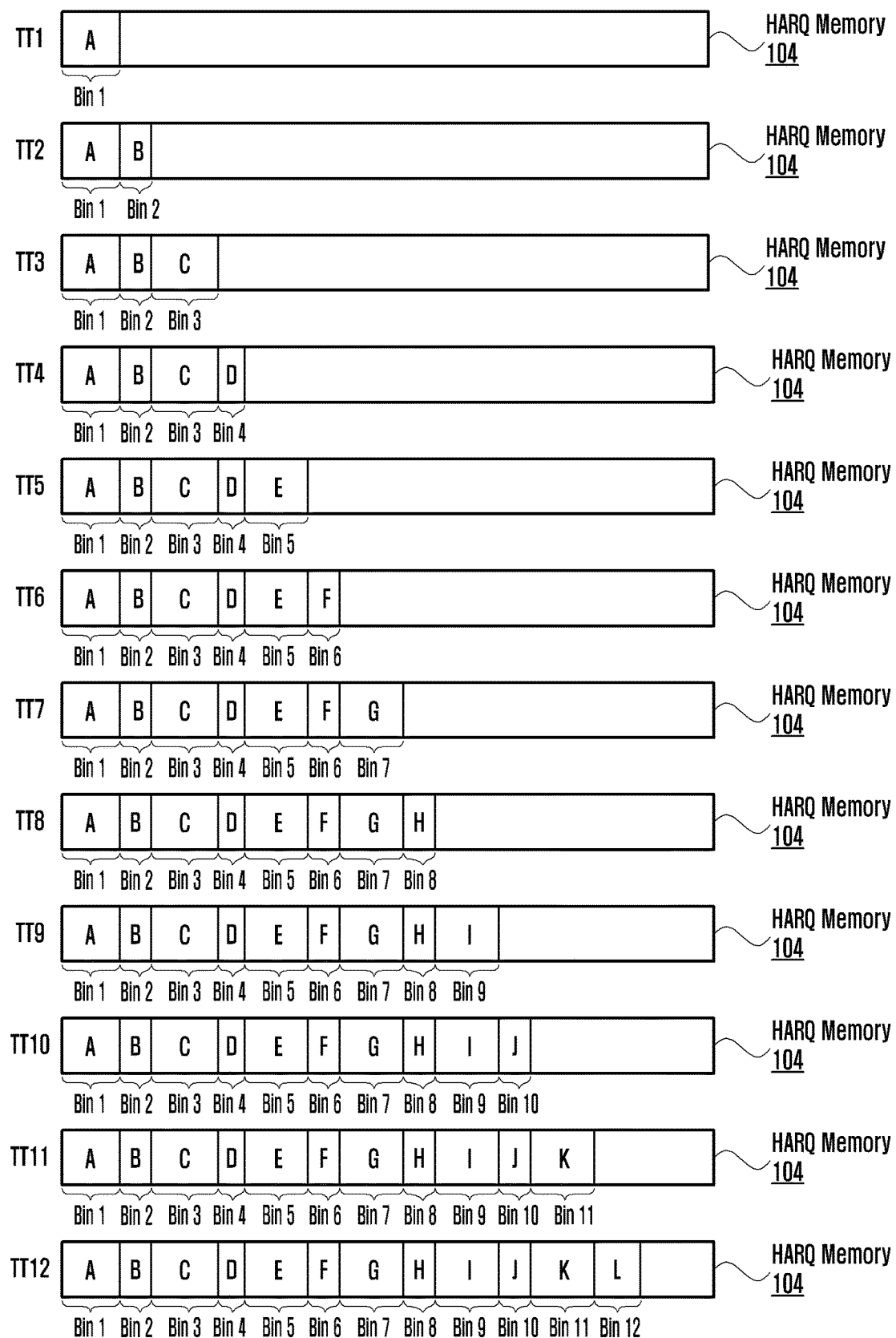
FIGS. 1B-1D illustrate a process for dynamic allocation of data packets in a hybrid automatic repeat request (HARQ) memory in accordance with an embodiment.
Figure 1C:
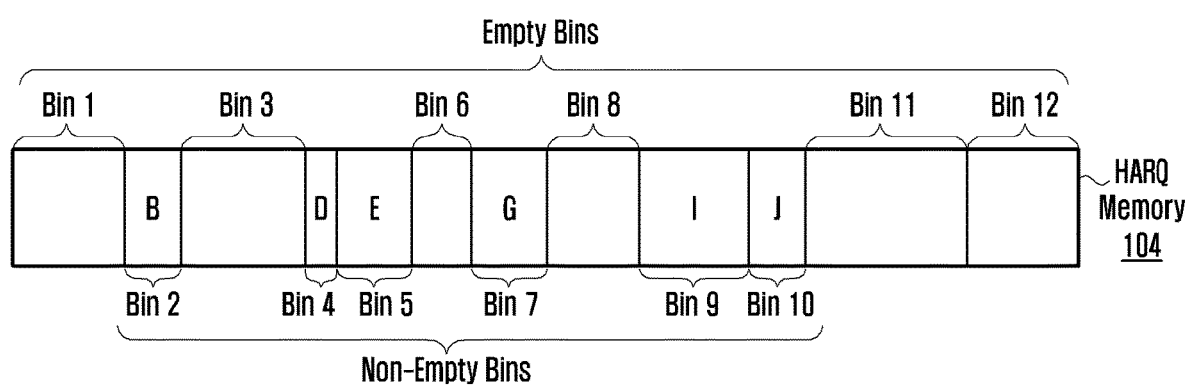
Figure 1D:
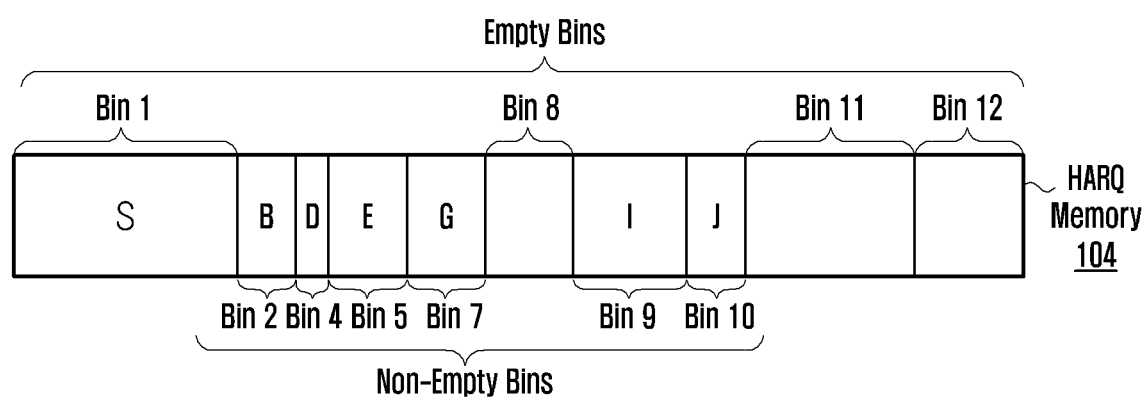

FIGS. 1B-1D illustrate a process for dynamic allocation of data packets in a HARQ memory 104 in accordance with an embodiment.

Referring to FIGS. 1B-1D, the BS 101 may transmit the same data packet in each predefined transmission time interval (TTI) to the UE 103 in a first predefined process, namely a chase combining technique. In another embodiment, the BS 101 may transmit a data packet along with one or more redundant bits to the UE 103 in a second predefined process, namely an incremental redundancy technique. At a first millisecond time instance 1 (e.g., TTI 1), the UE 103 may receive a data packet along with one or more redundant bits. The one or more redundant bits may be used for decoding the data packet at the UE 103. For example, three redundant bits may be transmitted by the BS 101 along with the data packet to the UE 103. Therefore, the size of a data packet "A" includes a size of the data packet and a size of the one or more redundant bits. For example, the size of the data packet may be "a". The size of the first redundant bit may be "a1", the size of the second redundant bit may be "a2" and the size of the third redundant bit may be "a3". Therefore, the size of the data packet "A" transmitted is a+a1+a2+a3. The data packet "A" may be stored in a memory location (also referred as a bin) bin 1.

Similarly, at a second millisecond time instance 2 (e.g., TT2), the UE 103 may receive data packet "B". The data packet "B" may be allocated in a memory location (also referred as bin 2) adjacent to bin 1 which is occupied by the data packet "A". Similarly, and so forth, at a twelfth millisecond time instance 12 (e.g., TT12), the UE 103 may receive data packet "L". At a thirteenth millisecond time instance 13 (e.g., TTI 13, the UE 103 may provide an indication as to whether the data packets are successfully received and decoded by the UE 103. For example, at TTI 13, the UE 103 may provide an acknowledgement confirming that the data packets A, C, F, H, K and L at bins bin 1, bin 3, bin 6, bin 8, bin 11 and bin 12 are received and decoded successfully. Since the data packets A, C, F, H, K and L are received and successfully decoded, the UE 103 may remove these data packets from the HARQ memory 104. Upon removal of these data packets, the HARQ memory 104 of the UE 103 may be as shown in FIG. 1C. FIG. 1C shows empty bins and non-empty bins. The empty bins bin 1, bin 3, bin 6, bin 8, bin 11 and bin 12 indicate free memory space since the data packets are removed. The non-empty bins bin 2, bin 4, bin 5, bin 7, bin 9 and bin 10 indicate occupied memory space by the respective data packets as the UE 103 has not provided an acknowledgement confirming that these packets are successfully received and decoded.

In an embodiment, at TTI 13, the BS 101 may intend to transmit a new data packet "S" to the UE 103. The UE 103 may receive information of a TBS of the data packet "S" to be transmitted to the UE 103. The TBS of the data packet "S" may be 50 kb. The UE 103 may identify a plurality of empty bins and a size of each of the plurality of empty bins. In this scenario, the UE 103 may identify that the bins bin 1, bin 3, bin 6, bin 8, bin 11 and bin 12 are empty. The size of each of the bins bin 1, bin 3, bin 6, bin 8, bin 11 and bin 12 may be 10 kb, 20 kb, 30 kb, 40 kb, 60 kb and 70 kb, respectively. In an embodiment, the UE 103 may identify one or more empty bins with sizes greater than the size of the TBS. In this scenario, the size of the data packet "S" is 50 kb. The size of the bins bin 11 and bin 12 are greater than the TBS of the data packet "S". The UE 103 may allocate the data packet "S" in a smallest size empty bin among the one or more empty bins to the data packet. In this scenario, since, size of the bin 11 is less than the size of bin 12, the data packet "S" may be allocated in bin 11 as shown in FIG. 1C.

In an embodiment, the UE 103 may detect an absence of one or more empty bins in the HARQ memory 104 wherein a size of the empty bins is greater than the TBS of the data packet. For example, the size of each of the bins bin 1, bin 3, bin 6, bin 8, bin 11 and bin 12 may be 10 kb, 20 kb, 30 kb, 40 kb, 10 kb and 30 kb, respectively, and the TBS of the data packet "S" may be 50 kb. As is evident, none of the sizes of the empty bins bin 1, bin 3, bin 6, bin 8, bin 11 and bin 12 is greater than the TBS of the data packer to allocate the data packet. In such a scenario, the UE 103 may reconfigure the plurality of empty bins until an empty bin with a size greater than the TBS of the data packet is created. The reconfiguration may be performed using a technique which may include, but is not limited to, a linked list technique. Therefore, the bins bin 1, bin 3 and bin 6 and may be reconfigured to form a new empty bin. Upon reconfiguring the empty bins bin 1, bin 3 and bin 6, the UE 103 may form the new empty bin of a size of 60 kb, which is greater than the TBS of the data packet. Therefore, the data packet "S" may be allocated to the new empty bin as shown in FIG. 1D.

In an embodiment, the UE 103 may transmit information associated with one of a presence or an absence of an empty bin with a size greater than the TBS of the data packet to one or more associated BS 101 upon detecting a presence or an absence of empty bins with sizes greater than the TBS of the data packet in the UE 103. If the BS 101 receives information associated with a presence of an empty bin with a size greater than the TBS of the data packet, then the BS 101 may transmit the data packet to the UE 103.

Figure 2A:
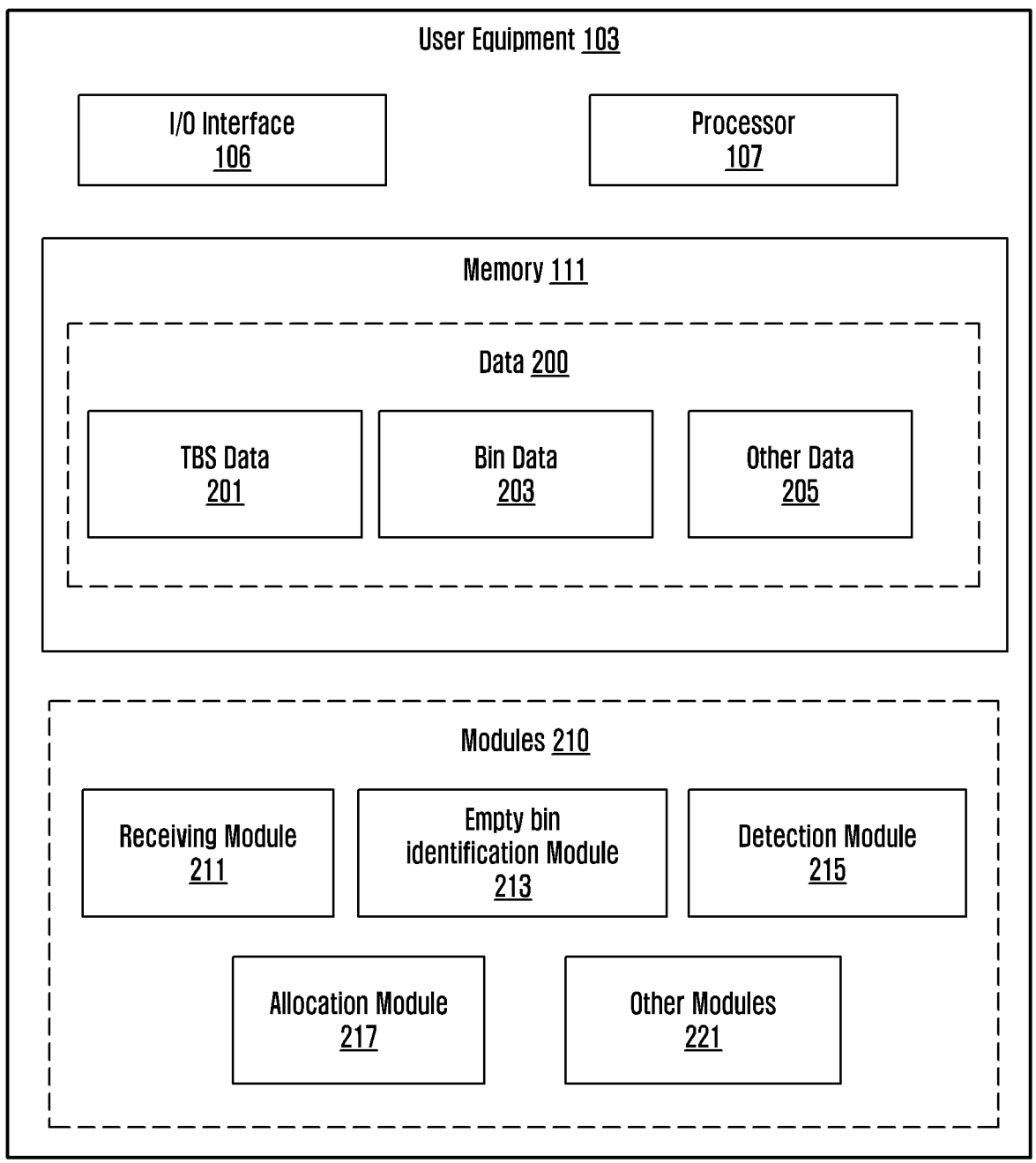
FIG. 2A illustrates a block diagram of a UE for dynamic memory management in accordance with an embodiment.

FIG. 2A illustrates a block diagram of the UE 103 for dynamic memory management in accordance with an embodiment.

Referring to FIG. 2A, the UE 103 may include an input/output (I/O) interface 106, a processor 107 and a memory 111. The I/O interface 106 may be configured to receive data packets from the BS 101. The UE 103 may also include data 200 and modules 210. For example, the data 200 may be stored in the memory 111. The data 200 may include TBS data 201, bin data 203 and other data 205. The modules 210 are described below in greater detail.

The data 200 may be stored in the memory 111 in a form of various data structures. Additionally, the data 200 can be organized using data models, such as relational or hierarchical data models. The other data 205 may store data, including temporary data and temporary files, generated by the modules 210 for performing the various functions of the UE 103.

The data 200 stored in the memory 111 may be processed by the modules 210 of the UE 103. The modules 210 may be stored within the memory 111. For example, the modules 210 communicatively coupled to the processor 107 configured in the UE 103 may also be present outside the memory 111 and implemented as hardware. As used herein, the term "modules" may refer to an application specific integrated circuit (ASIC), an electronic circuit, a processor 107 (e.g., shared, dedicated, or grouped) and the memory 111 that executes one or more software or firmware programs, a combinational logic circuit, and/or other suitable components that provide the described functionality.

The modules 210 may include, for example, a receiving module 211, an empty bin identification module 213, a detection module 215, an allocation module 217 and other modules 221. The other modules 221 may be used to perform various miscellaneous functionalities of the UE 103. It will be appreciated that such aforementioned modules 210 may be represented as a single module or a combination of different modules.

The modules 210, when configured with the functionality defined in the present disclosure, will result in a novel hardware.

The receiving module 211 may be configured to receive TBS information associated with a data packet from the BS 101. The receiving module 211 may receive the TBS of the data packet which is to be transmitted by the BS 101 to the UE 103. The TBS may indicate a size of the data packet. The received TBS of the data packet may be stored as TBS data 201.

The empty bin identification module 213 may be configured to identify the empty bins in the HARQ memory 104 of the UE 103. The UE 103 may identify the plurality of empty bins and a size of each of the plurality of empty bins. As an example, the plurality of empty bins is that from which the data packets are removed as they have been successfully received and decoded by the UE 103. The information associated with identified empty bins may be stored as bin data 203.

The detection module 215 may be configured to detect a presence of one or more empty bins among the plurality of empty bins in the HARQ memory 104 wherein the sizes of the one or more empty bins are greater than the TBS of the data packet. For example, there may be three empty bins bin 1, bin 2 and bin 3 whose sizes may be 10 kb, 30 kb and 40 kb, respectively. The TBS of the data packet may be 20 kb. The detection module 215 may detect a presence of two empty bins bin 2 and bin 3 with sizes greater than the TBS of the data packet.

The allocation module 217 may allocate the data packet to the smallest size empty bin among the one or more empty bins. In the exemplary scenario, the sizes of the empty bins bin 1, bin 2 and bin 3 may be 10 kb, 30 kb and 40 kb, respectively. Since the sizes of both empty bins bin 2 and bin 3 are greater than the TBS of the data packet, the data packet may be allocated to bin 2 or bin 3. The allocation module 217 may allocate the data packet to the smallest empty bin among the one or more empty bins. Therefore, the allocation module 217 may allocate the data packet to the empty bin bin 2 since the size of the empty bin bin 2 is smaller than the size of the empty bin bin 3. Therefore, the data packet may be allocated in the empty bin bin 2.

There may not be one or more empty bins in the HARQ memory 104 with sizes greater than the TBS of the data packet. For example, the TBS of the data packet may be 50 kb and the size of the empty bins bin 1, bin 2 and bin 3 may be 10 kb, 30 kb and 40 kb, respectively. In such a scenario, the UE 103 may reconfigure the one or more empty bins. The one or more empty bins may be reconfigured based on a link list wherein each of the one or more empty bins are linked using the link list. Due to the reconfiguration, the size of the empty bin is a sum of the size of the plurality of empty bins. For example, the size of the empty bins bin 1, bin 2 and bin 3 may be reconfigured to obtain an empty bin of size 80 kb which is greater than the TBS of the data packet which is 50 kb.

The UE 103 may transmit information associated with a presence or an absence of an empty bin with a size greater than the TBS of the data packet to the one or more BS 101.

The UE 103 may implement the methods described below for transmitting the information.

Method 1

Figure 2B:
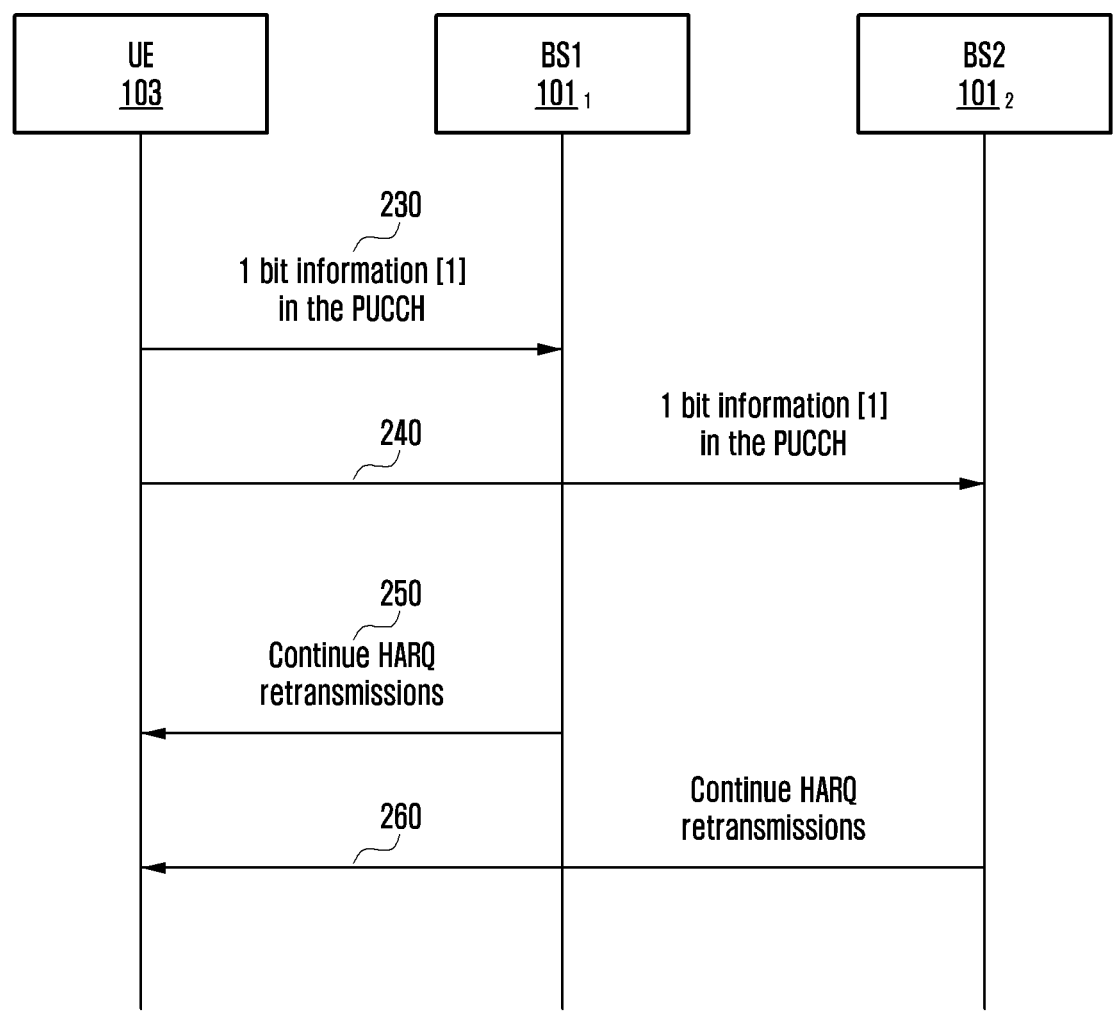
FIGS. 2B-2C illustrate sequence flow diagrams of a process of communication between the UE and base stations BS1 and BS2 in accordance with an embodiment.

In an embodiment, the UE 103 may be associated with two base stations BS 1 $101_1$ and BS2 $101_2$ as shown in FIG. 2B. FIG. 2B illustrates a sequence flow diagram of a process of communication between the UE 103 and base stations BS 1 $101_1$ and BS2 $101_2$. Referring to FIG. 2B, the UE 103 may transmit information associated with a presence or an absence of an empty bin using "1 bit" information on a physical uplink control channel (PUCCH) between the UE 103 and the base stations BS1 $101_1$ and BS2 $101_2$. The UE 103 may transmit the "1 bit" information "0" upon detecting an absence of an empty bin and transmit "1 bit" information "1" upon detecting a presence of an empty bin in the UE 103. For example, the UE 103 may transmit the "1 bit" information "1" to both the base stations BS1 $101_1$ and BS2 $101_2$ in the PUCCH in steps 230 and 240, respectively. Upon receiving the "1" bit information "1", both the base stations BS1 $101_1$ and BS2 $101_2$ may continue to retransmit the data packets to the UE 103 in steps 250 and 260, respectively.

Method 2

Figure 2C:
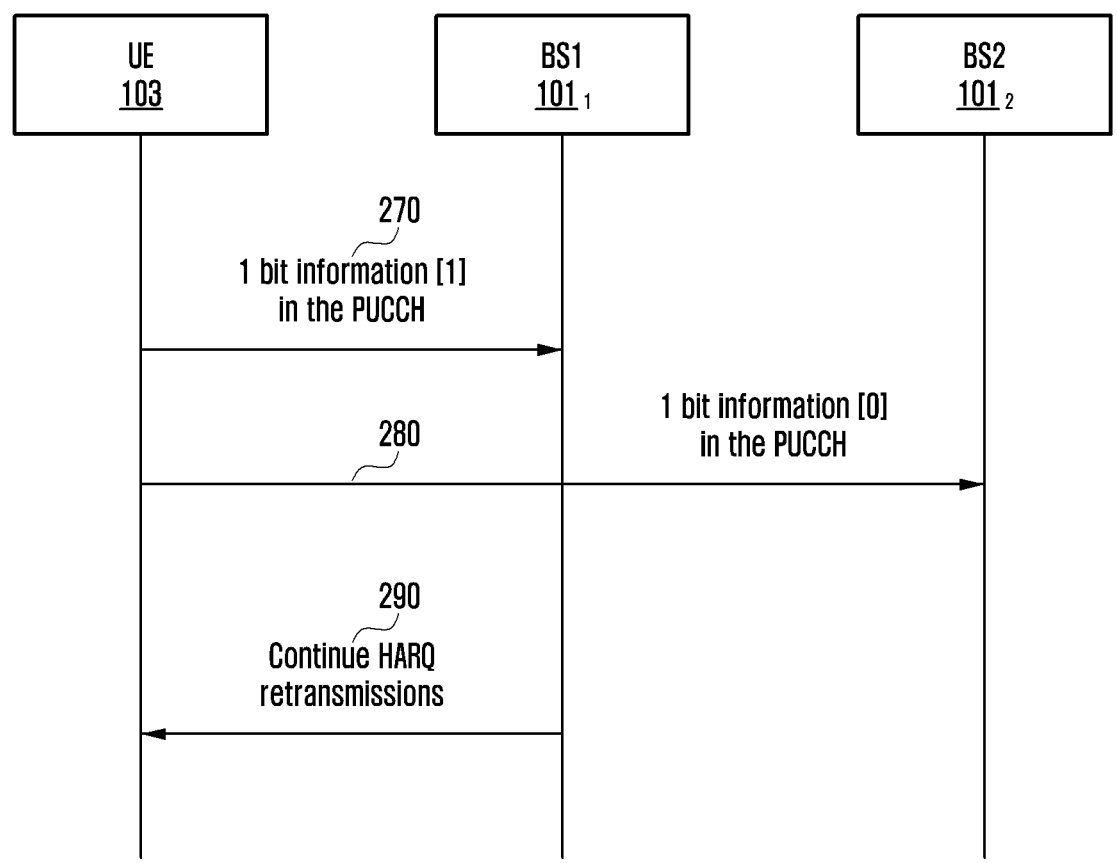

In an embodiment, the UE 103 may be associated with two base stations BS1 $101_1$ and BS 2 $101_2$ as shown in FIG. 2C. FIG. 2C illustrates a sequence flow diagram of a process of communication between the UE 103 and the base stations BS1 $101_1$ and BS2 $101_2$. Referring to FIG. 2C, the UE 103 may transmit information associated with a presence or an absence of an empty bin using "1 bit" information on a PUCCH between the UE 103 and the base stations, BS1 $101_1$ and BS2 $101_2$. The UE 103 may transmit the "1 bit" information "0" upon detecting an absence of an empty bin and transmit "1 bit" information "1" upon detecting a presence of an empty bin in the UE 103. For example, the UE 103 may transmit the "1 bit" information "1" to the base station, BS1 $101_1$ and "1 bit" information "0" to the base station BS2 $101_2$ in the PUCCH in steps 270 and 280, respectively. Upon receiving the "1 bit" information "1", the BS1 $101_1$ may continue to transmit the data packet to the UE 103 at step 290. Further, upon receiving the "1 bit" information "0", the BS2 $101_2$ may not transmit the data packet to the UE 103 as there is no availability of an empty bin for the data packet. If an empty bin with a size greater than the TBS of the data packet is unavailable, the UE 103 may not transmit "1 bit" information "0". The unavailability of the "1 bit" information may provide an indication to the UE 103 about an absence of an empty bin. The UE 103 and the associated BS 101 may implement same protocols for dynamic memory management in the UE 103. In such a scenario, the UE 103 may not provide "1 bit" information to indicate a presence or an absence of empty bins in the HARQ memory 104 of the UE 103.

Figure 3:
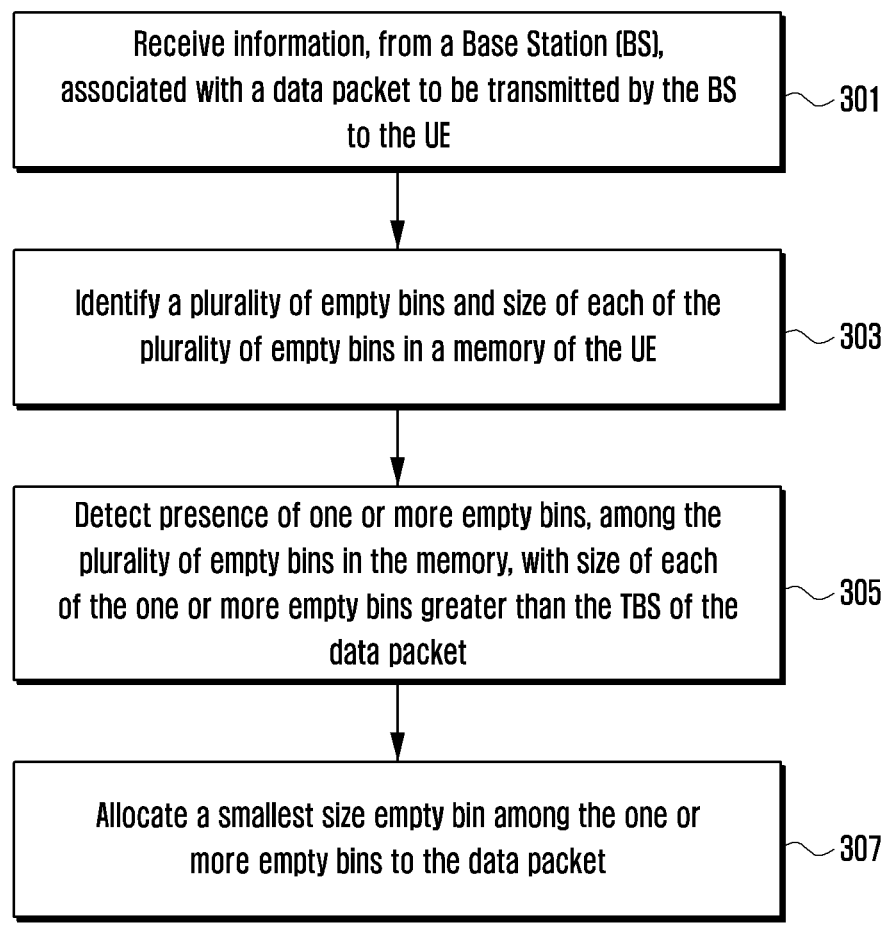
FIG. 3 illustrates a flowchart of a method of dynamic memory management in a UE in accordance with an embodiment.

FIG. 3 illustrates a flowchart of a method of dynamic memory management in a UE in accordance with an embodiment.

Referring to FIG. 3, the method may be described in a general context of computer executable instructions. Generally, computer executable instructions may include routines, programs, objects, components, data structures, procedures, modules, and functions, which perform specific functions or implement specific abstract data types.

The order in which the method is described is not intended to be construed as a limitation, and any number of the described steps in the method may be combined in any order to implement the method. Additionally, individual steps may be deleted from the method without departing from the scope and spirit of the subject matter described herein.

Furthermore, the method may be implemented in any suitable hardware, software, firmware, or combination thereof.

Referring to FIG. 3, at step 301, the method may include receiving TBS information from the BS 101. The TBS information may be associated with a data packet which is to be transmitted by the BS 101 to the UE 103. The TBS may indicate a size of the data packet.

At step 303, the method may include identifying a plurality of empty bins and a size of each of the plurality of empty bins in a HARQ memory 104 of the UE 103. The UE 103 may include the HARQ memory 104 configured to store the data packets. The HARQ memory 104 may be configured in the form of a plurality of bins wherein each of the plurality of bins is configured to store the data packets. The UE 103 may identify a plurality of empty bins in the memory of the UE 103, if the bins do not include any packets. Once the data packet is received by the UE 103 and successfully decoded, the UE 103 may remove the data packet from the bin and, hence, the bin may be empty. The UE 103 may also identify a size of each of empty bin.

At step 305, the method may include, detecting presence of one or more empty bins among the plurality of empty bins in the HARQ memory 104 wherein a size of each of the one or more empty bins are greater than the TBS of the data packet. The UE 103 may compare the TBS of the data packet and the sizes of the empty bins and detect those empty bins whose sizes are greater than the TBS of the data packet.

At step 307, the method may include allocating a smallest size empty bin among the one or more empty bins to the data packet. For example, there may be three empty bins with sizes 50 kb, 80 kb and 10 kb. The UE 103 may select the empty bin with size 10 kb, since the empty bin with size 10 kb is has the smallest size as compared to the other empty bins.

In an embodiment, the UE 103 may detect an absence of one or more empty bins whose sizes are less than a TBS of a data packet. In such a scenario, the UE 103 may reconfigure the plurality of empty bins to create an empty bin with a size greater than the TBS of the data packet. The reconfiguration may be performed by correlating empty bins until an empty bin is created whose size is greater than the TBS of the data packet.

The method disclosed in the present disclosure may be implemented for any wireless device or system such as wireless fidelity (WiFi), narrow band-Internet of Things (NB-IOT), enhanced mobile broadband (eMBB), enhanced machine-type communication (eMTC) and machine to machine communication systems.

The terms "an embodiment", "embodiment" "embodiments", "the embodiment", "the embodiments", "one or more embodiments", "some embodiments", and "one embodiment" indicate one or more (but not all) embodiments of the present disclosure, unless expressly specified otherwise.

The terms "including", "comprising", "having" and variations thereof indicate including but not limited to, unless expressly specified otherwise. The enumerated listing of items does not imply that any or all of the items are mutually exclusive, unless expressly specified otherwise.

The terms "a", "an" and "the" indicate one or more, unless expressly specified otherwise.

A description of an embodiment with several components in communication with each other does not imply that all such components are required. On the contrary, a variety of optional components are described above to illustrate the wide variety of possible embodiments of the present disclosure.

Where a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present disclosure need not include the device itself.

Finally, the terms used in the present disclosure are not intended to delineate or circumscribe the present disclosure. It is therefore intended that the scope of the present disclosure not be limited by a description, but rather by the appended claims and their equivalents. Accordingly, the present disclosure is intended to be illustrative, but not limiting, of the scope of the present disclosure, which is set forth in the appended claims.

While the present disclosure has been shown and described with reference to certain embodiments thereof, it will be apparent to those skilled in the art that various changes in form and details may be made therein without departing from the scope of the present disclosure as defined by the appended claims and their equivalents.

What is claimed is:

1. A method of dynamic memory management in a user equipment (UE), the method comprising:
   receiving, from a base station (BS), transport block size (TBS) information associated with a data packet to be transmitted by the BS to the UE;
   identifying a plurality of empty bins and a size of each of the plurality of empty bins in a memory of the UE;
   determining, from the plurality of empty bins, whether at least one empty bin with a size greater than the TBS of the data packet exists; and
   in case that the at least one empty bin with a size greater than the TBS of the data packet exists:
      transmitting, to the BS, information indicating a presence of the at least one empty bin with a size greater than the TBS of the data packet; and
      allocating, from among the at least one empty bin, a smallest size empty bin with a size greater than the TBS of the data packet, to the data packet.

2. The method of claim 1, further comprising:
   in case that the at least one empty bin with a size greater than the TBS of the data packet does not exist:
      reconfiguring the plurality of empty bins to create an empty bin with a size greater than the TBS of the data packet; and
      allocating the created empty bin to the data packet.

3. The method of claim 1, further comprising, in case that the at least one empty bin with a size greater than the TBS of the data packet does not exist, transmitting information indicating an absence of the at least one empty bin with a size greater than the TBS of the data packet to a first BS and a second BS, in case that the UE is associated with both of the first BS and the second BS,
   wherein the information indicating the absence of the at least one empty bin with a size greater than the TBS of the data packet is differently transmitted for the first BS and the second BS.

4. The method of claim 1, further comprising receiving the data packet from the BS in case that the information indicates the presence of the at least one empty bin with a size greater than the TBS of the data packet.

5. The method of claim 2, wherein reconfiguring the plurality of empty bins comprises correlating one or more empty bins with a size smaller than the TBS of the data packet until the empty bin with a size greater than the TBS of the data packet is created.

6. The method of claim 2, wherein reconfiguring the plurality of empty bins comprises reconfiguring the plurality of empty bins based on a link list.

7. The method of claim 1, wherein the data packet is associated with a hybrid automatic repeat request (HARQ) process.

8. The method of claim 1, further comprising receiving, from the BS, a same data packet in each of one or more predefined time intervals in a first predefined hybrid automatic repeat request (HARQ) process.

9. The method of claim 1, further comprising receiving, from the BS, the data packet along with one or more redundant bits in each of one or more predefined time intervals in a second predefined hybrid automatic repeat request (HARQ) process.

10. A user equipment (UE) for dynamic memory management, the UE comprising:
 a processor; and
 a memory communicatively coupled to the processor;
 wherein the processor is configured to:
  receive, from a base station (BS), transport block size (TBS) information associated with a data packet to be transmitted by the BS to the UE;
  identify a plurality of empty bins and a size of each of the plurality of empty bins in the memory of the UE;
  determine, from the plurality of empty bins, whether at least one empty bin with a size greater than the TBS of the data packet exists; and
  in case that the at least one empty bin with a size greater than the TBS of the data packet exists:
   transmit, to the BS, information indicating presence of the at least one empty bin with a size greater than the TBS of the data packet; and
   allocate, from among the at least one empty bin, a smallest size empty bin with a size greater than the TBS of the data packet, to the data packet.

11. The UE of claim 10, wherein the processor is configured to:
 in case that the at least one empty bin with a size greater than the TBS of the data packet does not exist:
  reconfigure the plurality of empty bins to create an empty bin with a size greater than the TBS of the data packet; and
  allocate the created empty bin to the data packet.

12. The UE of claim 10, wherein the processor is configured to, in case that the at least one empty bin with a size greater than the TBS of the data packet does not exist, transmit information indicating an absence of the at least one empty bin with a size greater than the TBS of the data packet to a first BS and a second BS, in case that the UE is associated with both of the first BS and the second BS, and
 wherein the information indicating the absence of the at least one empty bin with a size greater than the TBS of the data packet is differently transmitted for the first BS and the second BS.

13. The UE of claim 10, wherein the processor is further configured to receive the data packet from the BS in case that the information indicates the presence of the at least one empty bin with a size greater than the TBS of the data packet.

14. The UE of claim 11, wherein the processor is further configured to reconfigure the plurality of empty bins by correlating one or more empty bins with a size smaller than the size of the TBS of the data packet until the empty bin with a size greater than the TBS of the data packet is created.

15. The UE of claim 11, wherein the processor is further configured to reconfigure the plurality of empty bins based on a link list.

16. The UE of claim 10, wherein the data packet is associated with a hybrid automatic repeat request (HARQ) process.

17. The UE of claim 10, wherein the processor is configured to receive, from the BS, a same data packet in each of one or more predefined time intervals in a first predefined hybrid automatic repeat request (HARQ) process.

18. The UE of claim 10, wherein the processor is configured to receive, from the BS, the data packet along with one or more redundant bits in each of one or more predefined time intervals in a second predefined hybrid automatic repeat request (HARQ) process.

* * * * *